(12) United States Patent
Ogale et al.

(10) Patent No.: US 10,628,686 B2
(45) Date of Patent: Apr. 21, 2020

(54) NEURAL NETWORKS FOR OBJECT DETECTION AND CHARACTERIZATION

(71) Applicant: Waymo LLC, Mountain View, CA (US)

(72) Inventors: Abhijit Ogale, Sunnyvale, CA (US); Alexander Krizhevsky, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 110 days.

(21) Appl. No.: 15/919,045

(22) Filed: Mar. 12, 2018

(65) Prior Publication Data

US 2019/0279005 A1   Sep. 12, 2019

(51) Int. Cl.
| | |
|---|---|
| G06K 9/00 | (2006.01) |
| G05D 1/02 | (2020.01) |
| G06N 3/08 | (2006.01) |
| B60R 1/00 | (2006.01) |
| G06N 3/04 | (2006.01) |

(52) U.S. Cl.
CPC .......... G06K 9/00805 (2013.01); B60R 1/00 (2013.01); G05D 1/0221 (2013.01); G06N 3/0454 (2013.01); G06N 3/08 (2013.01); G06N 3/084 (2013.01); B60R 2300/8093 (2013.01)

(58) Field of Classification Search
CPC ............... G06K 9/00805; B60R 1/00; B60R 2300/8093; G05D 1/0221; G06N 3/0454; G06N 3/08
See application file for complete search history.

(56) References Cited

U.S. PATENT DOCUMENTS

| | | | |
|---|---|---|---|
| 9,202,144 B2 | 12/2015 | Wang et al. | |
| 9,424,493 B2 | 8/2016 | He et al. | |
| 9,619,735 B1 | 4/2017 | Lineback et al. | |
| 9,665,802 B2 | 5/2017 | Wang et al. | |
| 9,697,416 B2 | 7/2017 | Shen et al. | |
| 2017/0147905 A1 | 5/2017 | Huang et al. | |
| 2017/0308770 A1 | 10/2017 | Jetley et al. | |
| 2018/0348374 A1* | 12/2018 | Laddha ................. | G01S 17/66 |

(Continued)

OTHER PUBLICATIONS

Hara et al. "Attentional Network for Visual Object Detection," arXiv 1702.01478v1, Feb. 6, 2017, 8 pages.

(Continued)

*Primary Examiner* — Xin Jia
(74) *Attorney, Agent, or Firm* — Fish & Richardson P.C.

(57) ABSTRACT

Methods, systems, and apparatus, including computer programs encoded on computer storage media, for selecting locations in an environment of a vehicle where objects are likely centered and determining properties of those objects. One of the methods includes receiving an input characterizing an environment external to a vehicle. For each of a plurality of locations in the environment, a respective first object score that represents a likelihood that a center of an object is located at the location is determined. Based on the first object scores, one or more locations from the plurality of locations are selected as locations in the environment at which respective objects are likely centered. Object properties of the objects that are likely centered at the selected locations are also determined.

20 Claims, 7 Drawing Sheets

(56) References Cited

U.S. PATENT DOCUMENTS

2019/0147600 A1* 5/2019 Karasev .......... G06T 7/248
382/107

OTHER PUBLICATIONS

Ren et al. "Faster R-CNN: Towards Real-Time Object Detection with Region Proposal Networks," arXiv 1506.01497v3, Jan. 6, 2016, 14 pages.

Chen et al, "Monocular 3D object detection for autonomous driving," IEEE Xplore, 2016, 10 pages.

Chen et al, "Multi-view 3D object detection network for autonomous driving," arXiv, Jul. 22, 2017, 9 pages.

Du et al, "Car detection for autonomous vehicle: Lidar and vision fusion approach through deep learning framework," IEEE Xplore.

PCT International Search Report and Written Opinion in International Appln. PCT/US2019/021828, dated Jun. 17, 2019, 16 pages.

Prabhakar et al, "Obstacle detection and classification using deep learning for tracking in high-speed autonomous driving," IEEE Xplore, 2017, 6 pages.

Ren et al, "Faster R-CNN Towards Real-Time Object Detection with Region Proposal Networks," IEEE Xplore, Jan. 6, 2016, 9 pages.

\* cited by examiner

NEURAL NETWORKS FOR OBJECT DETECTION AND CHARACTERIZATION

BACKGROUND

This specification relates generally to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have computer systems that implement neural networks for object classification within images. For example, a neural network can be used to determine that an image captured by an on-board camera is likely to be an image of a nearby car.

Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameters can be used to make predictions in a production system.

Autonomous and semi-autonomous vehicle systems can use predictions generated by a neural network to make driving decisions.

SUMMARY

This specification describes techniques for selecting one or more locations in an environment of a vehicle where objects are likely centered and determining properties of those objects.

A system on an autonomous or semi-autonomous vehicle receives an input characterizing an environment external to the vehicle. The input includes, for each of the locations in the environment, sensor data captured by one or more sensors of the vehicle. The system determines, from the input and for each of the locations, a first object score that represents a likelihood that a center of an object is located at the location. One or more of the locations are then selected as locations in the environment at which objects are likely centered. The selection is based on the object scores. Next, the system of the vehicle obtains features characterizing the environment at each selected location. Finally, the system determines, for each of the selected locations and from the features of the selected locations, object properties of the objects that are likely centered at the selected locations. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. A neural network subsystem of an autonomous or semi-autonomous vehicle can select locations where objects are likely centered and determine properties of those objects. For given sensor data, a neural network selects the locations all at once, i.e., in a single forward pass of the neural network. This method of selection is preferable to selecting locations iteratively, i.e., to selecting only one location in a given forward pass of the neural network, because it is faster. Because all locations are selected in a single forward pass of the neural network, object properties of the objects centered at those locations can be determined in batches. This decreases the latency between the time the sensor data is captured and the time the object properties are determined. As such, the object properties can be provided to the control system of the vehicle more quickly, which allows the control system to make more accurate driving decisions. Selecting locations and determining object properties as described above also makes more efficient use of the computing resources of the vehicle.

Finally, because the system selects locations at which objects are likely centered in a computationally efficient manner in a first stage and then determines properties of those objects in a second, different stage, the second stage can be more computationally expensive and rely on more information. This results in more accurate object property predictions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an autonomous or semi-autonomous vehicle can use a neural network system to detect objects and determine object properties based on sensor data characterizing an environment external to the vehicle. In particular, the neural network system can determine the likelihood that the center of an object is located at particular locations in the environment. After determining with a certain confidence that a location does correspond to the center of an object, the neural network system can determine object properties of that object. The neural network system can be trained to detect and determine properties of objects of any class, including vehicles, pedestrians, bicyclists, or lane markers, to name just a few examples.

Figure 1:
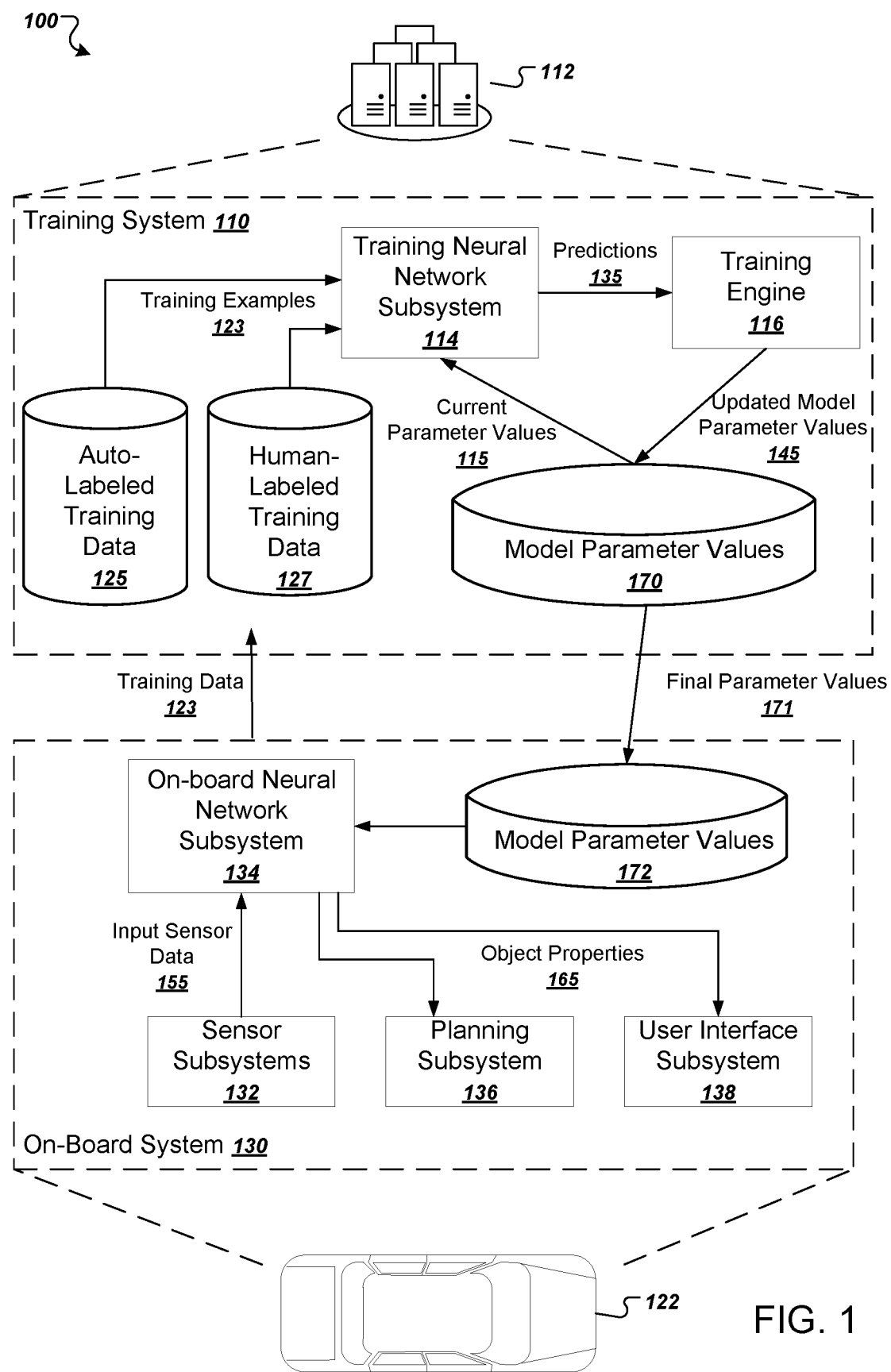
FIG. 1 is a diagram of an example system.

FIG. 1 is a diagram of an example system 100. The system 100 includes a training system 110 and an on-board system 130.

The on-board system 130 is physically located on-board a vehicle 122. Being on-board the vehicle 122 means that the on-board system 130 includes components that travel along with the vehicle 122, e.g., power supplies, computing hardware, and sensors. The vehicle 122 in FIG. 1 is illustrated as an automobile, but the on-board system 130 can be located on-board any type of vehicle. The vehicle 122 can be a fully autonomous vehicle that uses object detections and properties to inform fully-autonomous driving decisions. The vehicle 122 can also be a semi-autonomous vehicle that uses object detections and properties to aid a human driver. For example, the vehicle 122 can autonomously apply the brakes if the neural network system indicates that a human driver might collide with another vehicle.

The on-board system 130 includes one or more sensor subsystems 132. The sensor subsystems 132 include a combination of components that receive reflections of electromagnetic radiation off of surfaces in the environment. For example, a sensor subsystem might include a lidar system that detects reflections of laser light, a radar system that detects reflections of radio waves, a camera system that detects reflections of visible light, or some combination of the three. In some implementations, the one or more sensor subsystems 132 include audio sensors. Audio sensors can, for example, detect emergency vehicle sirens.

The sensor subsystems 132 provide input sensor data 155 to an on-board neural network subsystem 134. The input sensor data 155 can include multiple channels of data, where each channel represents a different characteristic of reflected electromagnetic radiation. Thus, multiple channels of input sensor data 155 can be generated from measurements from the same sensor. The sensor subsystems 132 continuously collect the input sensor data 155 at predetermined time intervals, e.g., every tenth of a second, as the vehicle 122 moves through the environment.

The sensor-subsystems 132, or the on-board neural network subsystem 134, or some combination of the two, transform raw sensor data into the multiple channels of input sensor data 155. To do so, the on-board system 120 can project the various characteristics of the raw sensor data into a common coordinate system.

The on-board neural network subsystem 134 can include one or more neural networks. For example, the on-board neural network subsystem 134 can include a center prediction neural network and an object property neural network. Each of these neural networks will be discussed in more detail later. The on-board neural network subsystem 134 implements the operations of each layer of its neural networks. Thus, the on-board neural network subsystem 134 includes one or more computing devices having software or hardware modules that implement the respective operations of each layer of the neural networks according to an architecture of the neural networks.

The on-board neural network subsystem 134 can implement the operations of each layer of the neural networks by loading a collection of model parameter values 172 that are received from the training system 110. Although illustrated as being logically separated, the model parameter values 172 and the software or hardware modules performing the operations may actually be located on the same computing device or, in the case of an executing software module, stored within the same memory device.

The on-board neural network subsystem 134 can use hardware acceleration or other special-purpose computing devices to implement the operations of one or more layers of the neural network. For example, some operations of some layers may be performed by highly parallelized hardware, e.g., by a graphics processing unit or another kind of specialized computing device. In other words, not all operations of each layer need to be performed by central processing units (CPUs) of the on-board neural network subsystem 134.

The on-board neural network subsystem 134 uses the input sensor data 155 and the neural networks to determine object properties 165 of objects predicted to be in the environment external to the vehicle. When a planning subsystem 136 receives the object properties 165, the planning subsystem 136 can use the object properties 165 to make fully-autonomous or semi-autonomous driving decisions. For example, the planning subsystem 136 can generate a fully-autonomous plan to navigate through or around other vehicles on a highway. As another example, the planning subsystem 136 can generate a semi-autonomous recommendation for a human driver to apply the brakes.

A user interface subsystem 138 can receive the object properties 165 and can generate a user interface presentation that indicates the locations of nearby objects, e.g., nearby vehicles. For example, the user interface subsystem 138 can generate a user interface presentation having image or video data containing a representation of the regions of space that are likely to be occupied by vehicles. An on-board display device can then display the user interface presentation for passengers of the vehicle 122.

The on-board neural network subsystem 134 can also use the input sensor data 155 to generate training data 123. The training data 123 can include the projected representations of the different channels of input sensor data. The on-board system 130 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a training neural network subsystem 114 that can implement the operations of each layer of the neural networks that are designed to make object predictions and determine object properties from input sensor data. The training neural network subsystem 114 includes a plurality of computing devices having software or hardware modules that implement the respective operations of each layer of the one or more neural networks according to an architecture of the neural networks.

The training neural networks generally have the same architecture and parameters as the on-board neural networks. However, the training system 110 need not use the same hardware to compute the operations of each layer. In other words, the training system 110 can use CPUs only, highly parallelized hardware, or some combination of these.

The training neural network subsystem 114 can compute the operations of each layer of the neural networks using current parameter values 115 stored in a collection of model parameter values 170. Although illustrated as being logically separated, the model parameter values 170 and the software or hardware modules performing the operations may actually be located on the same computing device or on the same memory device.

The training neural network subsystem 114 can receive training examples 123 as input. The training examples 123 can include auto-labeled training data 125, human-labeled training data 127, or some combination of the two. Each of the training examples 123 includes a representation of the different channels of input sensor data as well as one or more labels that indicate the center of objects within regions of space represented by the input sensor data and properties for those objects.

The training neural network subsystem 114 can generate, for each training example 123, one or more object predictions 135, where each object prediction comprises an object detection and properties for each detected object. A training engine 116 analyzes the object predictions 135 and compares the object predictions to the labels in the training examples 123. If the two differ, an error is indicated. The training engine 116 then generates updated model parameter values 145 by using an appropriate updating technique. For example, the model parameters might be updated by calculating the gradient of the error with respect to an individual model parameter. To decrease the error contribution, a value derived from the gradient can be subtracted from or added to the current value of the parameter. This is known as stochastic gradient descent with backpropagation. Other techniques known in the art can also be used to update the model parameters. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. The training system 110 can provide the final set of model parameter values 171 by a wired or wireless connection to the on-board system 120.

Figure 2:
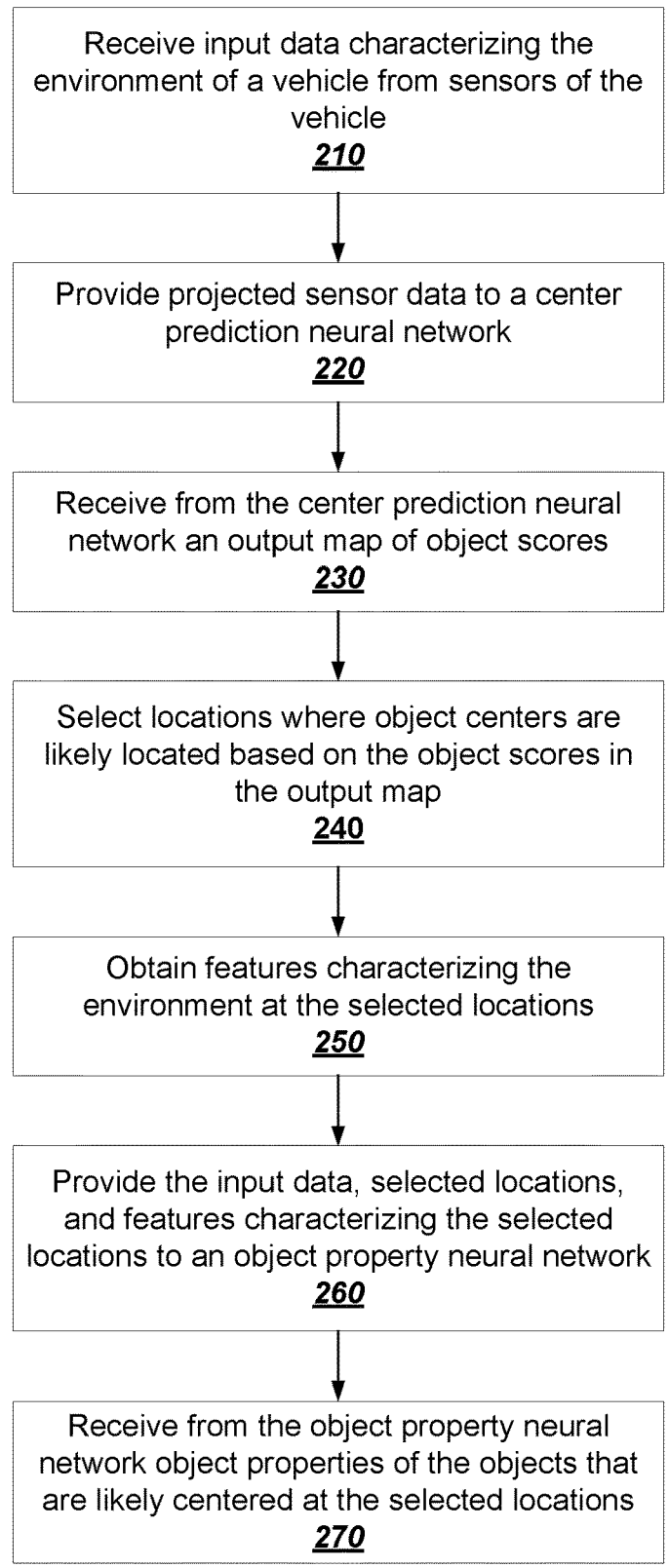
FIG. 2 is a flow chart of an example process for predicting object centers and determining object properties.

FIG. 2 is a flow chart of an example process for predicting object centers and determining object properties. The example process of FIG. 2 can be performed by the on-board neural network subsystem 134 of FIG. 1. The example process of FIG. 2 can also be performed by the training neural network subsystem 114 during training of the neural networks. Below, the example process of FIG. 2 is described in reference to the on-board neural network subsystem.

First, the neural network subsystem receives input sensor data characterizing the environment of the vehicle from sensors of the vehicle (210). The input sensor data can include reflections of laser light detected by a lidar sensor, reflections of radio waves detected by a radar sensor, reflections of light detected by a camera, or any combination of the three.

The neural network subsystem processes the input sensor data in preparation for providing it to a center prediction neural network. For example, the input sensor data can be mapped onto a projection plane, with each location in the projection plane corresponding to a region of space around the vehicle. The system can use any appropriate projection as long as all input sensor data is projected into the same coordinate system. For example, the system can use a top-down projection or a perspective projection. A top-down projection is a projection of the input sensor data onto a region surrounding the vehicle from a location above the vehicle itself. The projection plane for a top-down projection is thus substantially parallel to the surface on which the vehicle sits. A perspective projection is a projection of the input sensor data onto a plane in front of, behind, or to the side of the vehicle. The system can represent each projection as a tensor to be provided to the center prediction neural network.

If the example process of FIG. 2 is performed by the on-board neural network subsystem, the on-board neural network subsystem can receive the input sensor data and generate the corresponding projections. If the example process of FIG. 2 is performed by the training neural network system, the projections will already have been generated from the input sensor data by an on-board system or another system.

The neural network subsystem provides the projected sensor data as input to a center prediction neural network (220). The architecture of the center prediction neural network will be described in more detail below with reference to FIG. 4.

The neural network subsystem receives from the center prediction neural network an output map of object scores (230). The projection plane of the output map is typically the same as the projection plane of the projected sensor data provided to the center prediction neural network. For example, if the neural network subsystem provides a perspective projection of the projected sensor data to the center prediction neural network, then the output map of object scores will usually be a perspective map, e.g., a map of a plane in front of the vehicle. However, in another implementation, the center prediction neural network is trained to transform multiple projections in one plane, e.g., a perspective plane, into projections in another plane, e.g., a top-down projection.

Each location in the output map corresponds to a point in the projected sensor data and is associated with a numerical score representing the likelihood that the center of an object is located at a corresponding location in the environment. For example, the center prediction neural network can generate an output map with scores ranging from zero to one, where zero indicates a low likelihood that an object is centered at a particular location in the output map, and where one indicates a high likelihood that an object is centered at a particular location in the output map.

The center prediction neural network can generate the output map of object scores in a single forward pass. In other words, for given projected sensor data, the center prediction neural network need not determine object scores one at a time; rather, the center prediction neural network can generate object scores for given projected sensor data all at once. This is a "full-context" approach to object detection. It is distinguishable from the "sliding window" approach to object detection in which only small windows of input data are examined at any one time. The full-context approach is particularly valuable when detecting objects at long range, where it is harder to tell what an object is without looking at the overall context of the input sensor data.

In some implementations, the center prediction neural network can generate multiple output maps of object scores. In these implementations, each output map corresponds to a different object classification, i.e., a different object type. That is, each object score in a particular output map represents a likelihood that a center of an object of a particular classification is located at the associated location in the output map. For example, one output map can have object scores that each represent a likelihood that a center of a pedestrian is located at an associated location. Continuing with the example in which object scores range from zero to one, an object score of one would indicate a high likelihood that a center of a pedestrian is located at a particular location in the output map, while an object score of zero would indicate a low likelihood that a center of a pedestrian is located at a particular location. The presence of objects of other classifications, such as vehicles or road signs, at those particular locations would not alone result in a high object score.

The center prediction neural network can then generate separate output maps for vehicles, road signs, and objects of other classifications.

In some implementations, the center prediction neural network can generate three-dimensional output maps by stacking multiple projections together in a depth dimension. The center prediction neural network can also generate higher-dimensional output maps. For example, the center prediction neural network can generate a four-dimensional output map, where the fourth dimension is time. A four-dimensional output map depicts locations in three-dimensional space where objects are likely centered, but in which the locations can vary over time.

Next, the neural network subsystem predicts, based on the numerical object scores in the output map, locations where object centers are likely located (240). In one implementation, the neural network subsystem defines a threshold object score. For example, the neural network subsystem can select all locations in the output map associated with object scores that are 0.8 or higher. In such a case, 0.8 is the threshold object score. Locations associated with object scores that are lower than 0.8 are not selected.

In some cases, the neural network subsystem may suppress, i.e., unselect, some locations that exceed the threshold object score. For example, three adjacent locations in the output map may be associated with object scores of 0.8, 0.8, and 0.9, respectively. Continuing with the example above where locations associated with object scores that are 0.8 or higher are selected, each of those three adjacent locations are selected because each is associated with an object score that is 0.8 or higher. However, because the locations are adjacent, there is a high likelihood that their respective scores are each due to the likely presence of the same object. This is particularly true when location size is small, e.g., on the order of one pixel. In other words, only one of the three locations is likely to represent the center of a predicted object even though all three met the threshold object score. In such a case, the highest object score in a region can be selected, while other object scores in the same region, even if they exceed the threshold object score, are suppressed. This process helps to prevent multiple selections of the same object, i.e., of multiple locations being selected that each correspond to the same object. Local suppression of selected objects will be discussed in more detail in reference to FIG. 5.

In one implementation, after the neural network subsystem predicts locations where object centers are likely located, those selected locations are provided to the sensor subsystem so that the sensor subsystem can focus in on one or more of the selected locations. For example, in the case of a camera system, the camera can focus on one or more particular locations of interest. Doing so may be helpful in identifying multiple objects in a small region where that would not be possible with a wider camera view.

After selecting locations, the neural network subsystem obtains features characterizing the environment at the selected locations (250). In one implementation, the neural network subsystem receives the features from the center prediction neural network. In another implementation, it receives the features from a separate system.

For any given location in the environment, the neural network subsystem can obtain any of a variety of different features that characterize the environment at the given location. Because the center prediction neural network and the object property neural network, which is described below, are trained together, the center prediction neural network learns parameters that result in it outputting features that are useful to the object property neural network. The features are abstractions of the input sensor data generated by the convolutional layers of the center prediction neural network. For example, the center prediction neural network can learn to output the estimated scale of an object that is likely centered at a selected location.

The neural network subsystem provides to an object property neural network the output map of selected locations, the features characterizing the environment at the selected locations, and the input sensor data (260). In one implementation, the selected locations, features, and input sensor data are first provided to an intermediate neural network which iteratively prepares batches of inputs for the object property neural network, where each input in each batch corresponds to a location where an object is likely centered. Then, the batches of inputs are provided to the object property neural network, which processes the batches of inputs to generate object properties for the objects likely centered at each location. In another implementation, the intermediate neural network and the object property neural network are combined into a single neural network that both prepares the batches of inputs and processes those batches of inputs. The object property neural network is configured to output properties for all objects in a single forward pass.

In one implementation, the object property neural network classifies the object that is likely centered at each selected location. For example, possible classifications include "car," "pedestrian," "bicycle," "road marking," and "road sign." Based on its training and the three inputs, the object property neural network can select one of those classifications. The object property neural network can also define a bounding box for each predicted object. A bounding box is a box that identifies the boundaries or edges of an object. The bounding box can be two-dimensional or three-dimensional. A display interface of a vehicle can display such a bounding box to the driver of a semi-autonomous vehicle. The neural network subsystem can also provide the bounding box to the planning system of the vehicle for use in navigation of the vehicle. In some implementations, the object property neural network can predict a "mask" for each object. A mask differs from a bounding box in that it is form-fitted to a respective object. In other words, it more closely identifies the edges of the object. The mask can mark portions of the input sensor data that define the object.

In another implementation, the object property neural network determines how far the predicted object is from the vehicle.

The object property neural network can determine properties for multiple objects in parallel.

Once the neural network subsystem receives the object properties from the object property neural network (270), those object properties can be provided to a control system of the vehicle for use in controlling the vehicle. For example, if the object property neural network classifies a particular object as a pedestrian, and determines that the pedestrian is five feet from the front bumper of the vehicle, the control system, in response to those properties, can cause the car to brake.

Figure 3:
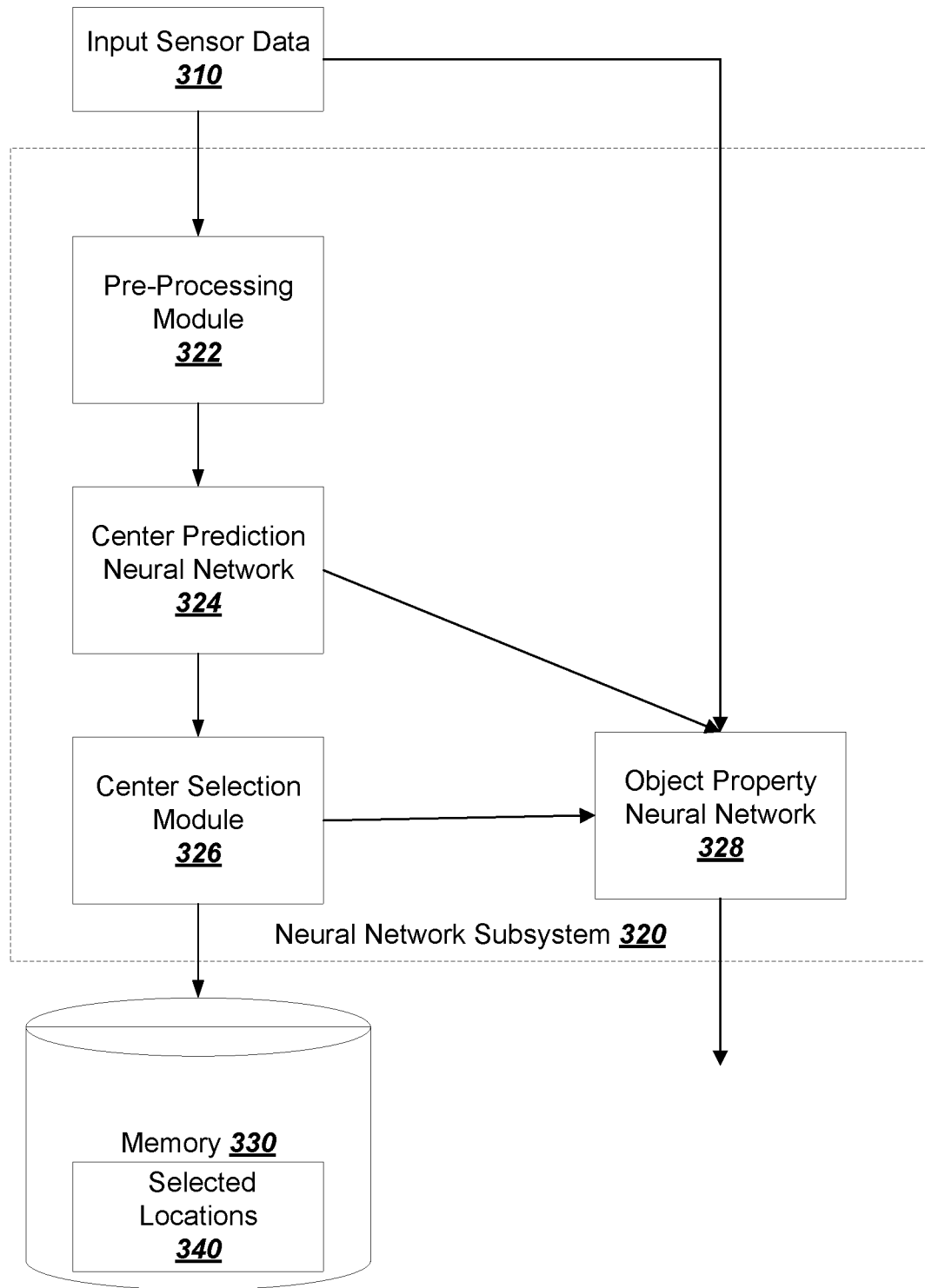
FIG. 3 is a diagram of an example neural network subsystem.

FIG. 3 is a diagram of an example neural network subsystem. The neural network subsystem 320 can be located on the vehicle. The neural network subsystem 320 can also be a training neural network subsystem located in an offline training system.

If the neural network subsystem 320 is located on the vehicle, it receives input sensor data 310 from the sensor subsystem of the vehicle. Specifically, the pre-processing module 322 of the neural network subsystem 320 receives the input sensor data 310. The pre-processing module 322 processes the input sensor data 310 in preparation for providing it to the center prediction neural network 324. In particular, the pre-processing module 322 maps the input sensor data onto a perspective projection plane or a top-down projection plane as described in reference to FIG. 2. In some circumstances, pre-processing may not be required. For example, if the input sensor data includes only a camera image, it is already in a form that can be processed by the center prediction neural network 324.

The center prediction neural network 324 receives from the pre-processing module 322 the projected sensor data prepared by the pre-processing module 322.

The center prediction neural network 324 is trained to generate an output map of object scores in a single forward pass of the neural network. In other words, for given projected sensor data, the center prediction neural network 324 need not determine one object score, store it in memory, and repeat; rather, the center prediction neural network 324 can generate object scores for given projected sensor data all at once. This is advantageous because fetching data from memory is time intensive.

The projection plane of the output map is usually the same as the projection plane of the projected sensor data provided to the center prediction neural network 324. Each location in the output map corresponds to a point in the projected sensor data and is associated with a numerical score representing the likelihood that the center of an object is located at a corresponding location in the environment.

In the implementation of the neural network subsystem 320 depicted in FIG. 3, the center prediction neural network is also trained to generate features characterizing the environment at the selected locations. However, in other implementations, a separate module or neural network can generate the features characterizing the environment at the selected locations.

The center prediction neural network 324 provides the output map of object scores to the center selection module 326 and to the object property neural network 328.

The center selection module 326 predicts locations where object centers are likely located based on the numerical object scores in the output map. This selection process is described in greater detail in reference to FIG. 5.

The center selection module 326 provides the selected locations to the object property neural network 328. The center selection module 326 can also write the selected locations 340 to memory 330.

The object property neural network 328 receives the selected locations, features characterizing the selected locations, and the input sensor data. In the implementation of the neural network subsystem 320 depicted in FIG. 3, the object property neural network 328 first prepares batches of inputs from the selected locations, features, and input sensor data, where each input in each batch corresponds to a selected location. The object properties of objects likely centered at the selected locations are then determined based on those batches of inputs. In another implementation, the selected locations, features, and the input sensor data are first provided to an intermediate neural network that prepares batches of inputs for the object property neural network. As depicted in FIG. 3, though, these two networks are combined into a single object property neural network that both prepares the batches of inputs and determines object properties.

The object property neural network 328 processes the batches of inputs all at once and is trained to determine properties for all objects in parallel, i.e., in a single forward pass through the network. Object properties include, as mentioned above, object classifications and object bounding boxes. The object property neural network 328 provides the object properties to planning and user interface subsystems of the vehicle so that the vehicle can use those properties in making driving decisions.

Figure 4:
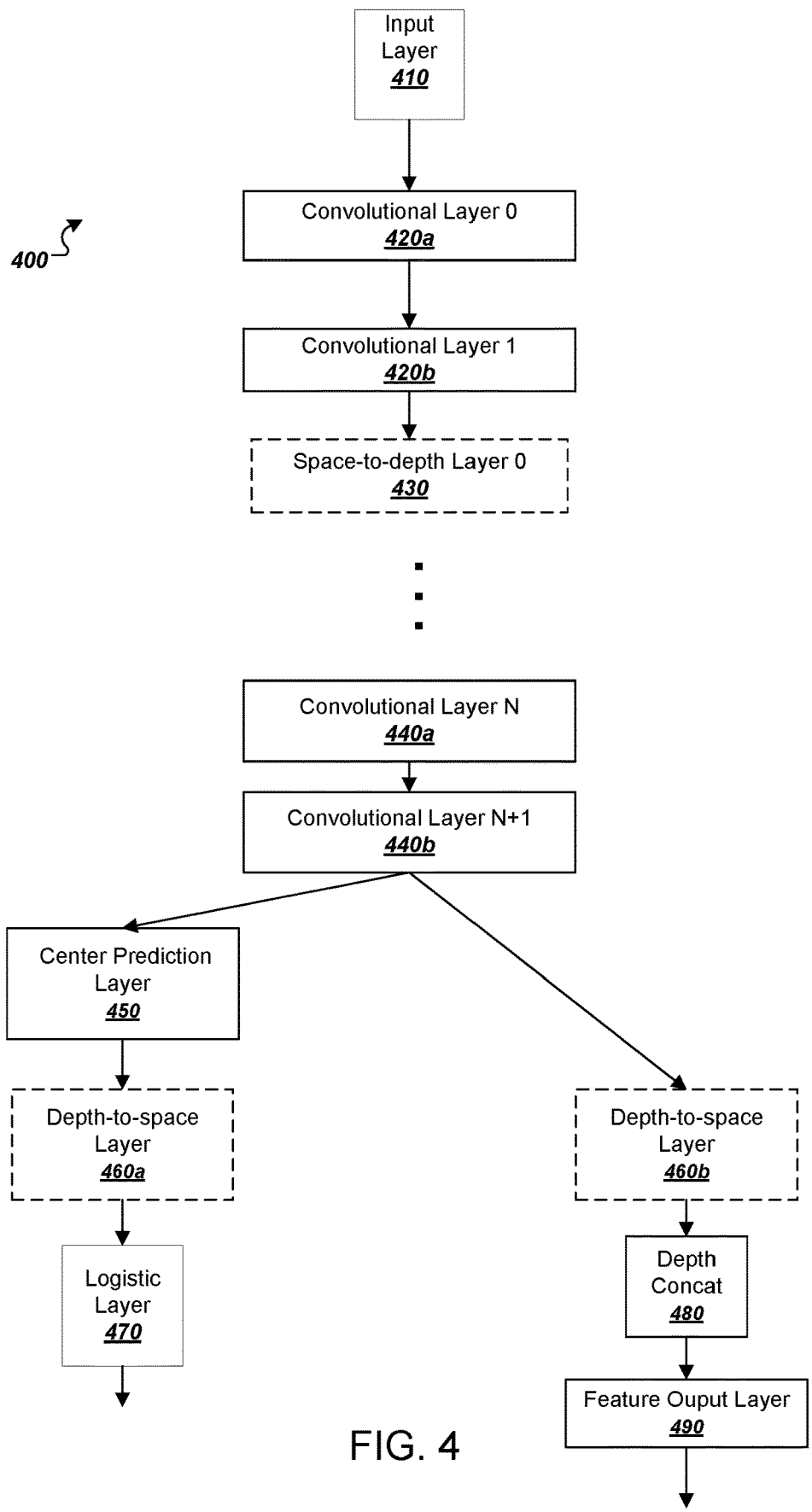
FIG. 4 is an example architecture of a neural network for predicting object centers.

FIG. 4 is an example architecture of a center prediction neural network 400 for predicting object centers.

The center prediction neural network 400 has an input layer 410. The input layer 410 receives tensors of projected sensor data. Although FIG. 4 depicts only one input layer, the center prediction neural network 400 can have multiple input layers to receive multiple channels of input sensor data, where each channel represents a different type of reflected electromagnetic radiation, e.g., visible light, laser light, radio waves, etc.

Center prediction neural network 400 has multiple convolutional layers, e.g., convolutional layers 420a, 420b, 440a, and 440b. Convolutional layers have a neuron connectivity that takes advantage of spatially local correlation in the projected sensor data. To do so, convolutional layers have sparse connectivity, with neurons in one convolutional layer receiving input from only a small subset of neurons in the previous neural network layer. The other neurons from which a neuron receives its input defines a receptive field for that neuron.

Convolutional layers have one or more parameters that define one or more filters for each layer, with each filter having one or more parameters. A convolutional neural network layer generates an output by performing a convolution of each neuron's filter with the layer's input. A convolution is a dot product of the parameters of a respective neuron's filter and the inputs to that neuron. The output is an activation map of that filter. In other words, the center prediction neural network 400 learns, i.e., is trained to have, filters that activate when it detects specific types of features at locations in the projected sensor data. Stacking the activation maps for all filters forms the full output of a convolutional neural network layer. Every output can thus be interpreted as an output of a neuron that looks at a small region of the projected sensor data and shares parameters with neurons in the same activation map.

Convolutional layers employ weight sharing so that all neurons in the same output channel have the same weight. This provides for translation invariance when detecting features in the projected sensor data.

The center prediction neural network 400 can also have one or more space-to-depth layers, including a space-to-depth layer 430, which are interspersed between the convolutional layers. The space-to-depth layer 430 transforms the information in the tensors of projected sensor data by stacking groupings of two-dimensional tensor elements into multiple three-dimensional depth slices. In general, a space-to-depth layer identifies G groups of input elements in an N×M×1 input tensor and transforms the input elements into a (N/C)×(M/D)×G output tensor, where C and D are constants that represent how the groupings are related, and G is equal to C×D. When the input to the space-to-depth layer 430 already includes multiple depth slices, the system can apply the space-to-depth layer 430 to each of the depth slices.

The space-to-depth layer 430 increases the effective receptive field of subsequent layers in the network and compresses the spatial dimensions of the projected sensor data. Each layer thus learns smaller filters, which allows a neural network system to more efficiently perform the operations of the subsequent convolutional layers without losing any precision.

The center prediction neural network 400 also has a depth concatenation layer 480 that takes as input one or more tensors and concatenates the tensors in the depth dimension. This operation can be described as "stacking" the input tensors to generate a new tensor. For example, the depth concatenation layer can 480 stack the inputs of the multiple channels of sensor data.

Center prediction neural network 400 also includes a center prediction layer 450 that generates object center predictions. The object center predictions generated by the center prediction layer 450 take the form of a feature map that identifies particular locations where object centers are likely located. Each point in the feature map is associated with a numerical score that represents the likelihood that an object center is located at a location in the environment corresponding to that point in the feature map. The scores generated by the center prediction layer 450 are real numbers that may be outside the range of zero to one. In some implementations, the center prediction layer 450 is a convolutional layer having filters that have been trained to activate when object centers are detected in the input to the layer. If the center prediction neural network 400 has one or more space-to-depth layers, it can also have one or more depth-to-space layers, including depth-to-space layers 460a and 460b. Depth-to-space layers reverse the transformation performed by the space-to-depth layers. These layers serve to increase the spatial resolution of the object center predictions.

Logistic layer 470 receives the feature map from the center prediction layer 450 and generates an output map of object scores between zero and one. As described in reference to previous figures, each location in the output map corresponds to a point in the projected sensor data and is associated with a numerical score representing the likelihood that the center of an object is located at a corresponding location in the environment.

The center prediction neural network 400 also has a feature output layer 490. Feature output layer 490 is a final convolutional layer that generates a respective feature vector for each location in the environment. The features are the result of multiple convolutions of the projected sensor data in the convolutional layers of the center prediction neural network 400.

Figure 5:
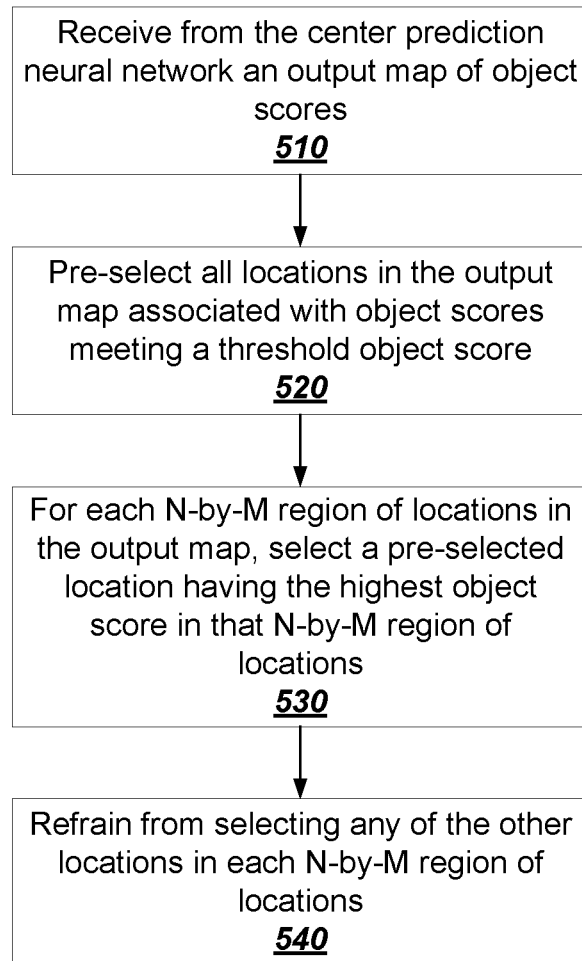
FIG. 5 is a flow chart of an example process for selecting object centers.

FIG. 5 is a flow chart of an example process for selecting object centers. For convenience, the example process will be described as being performed by a system of one or more computers located in one or more locations. For example, the center selection module 326 of FIG. 3 can perform the example process of FIG. 5.

First, the system receives the output map of object scores from the center prediction neural network (510). Each location in the output map corresponds to a point in the projected sensor data and is associated with a numerical score that represents the likelihood that the center of an object is located at a corresponding location in the environment.

Next, the system identifies a pre-determined threshold object score and pre-selects all locations associated with object scores meeting that threshold object score (520). For example, the center selection module can pre-select all locations in the output map associated with object scores that are 0.8 or higher. In such a case, 0.8 is the threshold object score. Locations associated with object scores that are lower than 0.8 are not pre-selected.

Following pre-selection, for each N-by-M region of locations in the output map, the system selects a single pre-selected location, if any, that is associated with a highest object score in that N-by-M region (530).

For example, three adjacent locations in the output map may be associated with object scores of 0.8, 0.8, and 0.9, respectively. Continuing with the above example, each of those three adjacent locations is pre-selected because each is associated with an object score that is 0.8 or higher. However, because the locations are adjacent, there is a high likelihood that their respective object scores are each due to the likely presence of the same object. This is particularly true when location size is small, e.g., on the order of one pixel. In other words, only one of the three locations is likely to represent the center of a predicted object even though all three meet the threshold object score. In such a case, the system selects a location associated with a highest object score in the region, while it refrains from selecting other locations in the same region, even if those locations are associated with object scores that exceed the threshold object score (540). This process helps to prevent multiple selections of the same object.

The selection of a location in one N-by-M region does not affect the selection of a location in another N-by-M region, so locations in different regions can be selected at the same time. N and M can be optimized based on the location size and typical object size. For example, if detected objects are normally very large, N and M can be increased. On the other hand, if detected objects are normally very small, N and M can be decreased.

In one implementation, N and M are each integers equal to three, and each location in the output map corresponds to a single pixel in the projected sensor data. In other words, the N-by-M region in the output map corresponds to a 3-by-3 region of pixels in the projected sensor data. In other implementations, N and M are different, e.g., three and four, respectively.

The example process of FIG. 5 can be performed in parallel for all N-by-M regions in the output map of object scores. This regional parallelization is preferable to selecting locations one at a time because it is faster, and it is possible because the suppressive effect of an object is spatially local.

In other words, although multiple objects should not be repeatedly detected in the same location, the detection of one object in one location has little effect on the detection of another object in a different location.

Figure 6:
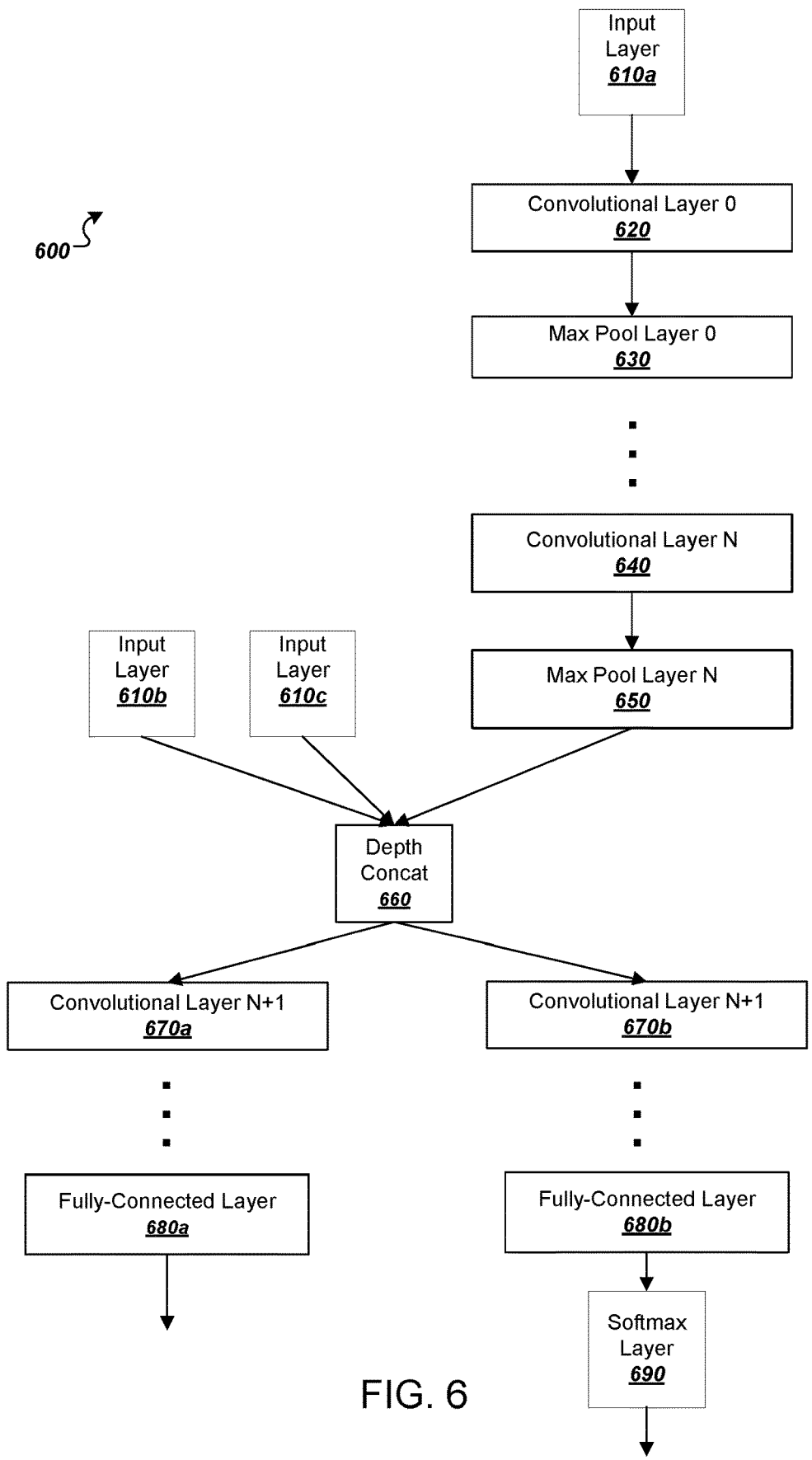
FIG. 6 is an example architecture of a neural network for determining properties of objects that are likely centered at selected locations.

In one implementation, the example process of FIG. 5 is performed a second time after the object property neural network outputs object properties for each object. Doing so further ensures that multiple objects are not repeatedly detected in the same location. FIG. 6 is an example architecture of an object property neural network 600 for determining properties of objects that are likely centered at selected locations. The object property neural network 600 determines bounding boxes and object classifications for the predicted objects. Bounding boxes are boxes that identify the boundaries or edges of objects. Object classifications are types of objects, e.g., "car," "pedestrian," "bicycle," "road marking," or "road sign."

In the implementation depicted in FIG. 6, an intermediate neural network prepares batches of inputs and provides those batches to the object property neural network 600. Each input in each batch corresponds to a location where an object is likely centered. The batches of inputs are prepared by combining the input sensor data, the selected locations, and features characterizing the environment at the selected locations.

Input layer 610*a* receives a batch of inputs prepared by the intermediate neural network. The batch of inputs for the input layer 610*a* is prepared by combining the input sensor data with the selected locations. The object property neural network 600 also has input layers 610*b* and 610*c*. The input layers 610*b* and 610*c* each receive a batch of inputs prepared by the intermediate neural network by combining the selected locations with the features characterizing the environment at the selected locations.

In some implementations, the object property neural network 600 receives other inputs. For example, the object property neural network 600 can receive sensor data that is of a higher resolution than the input sensor data received and used by the center prediction neural network. The object property neural network 600 can also receive sensor data that is collected by different sensors than the ones used to collect the input sensor data for the center prediction neural network. For example, the object property neural network 600 can receive lidar data while the center prediction neural network receives camera data.

The object property neural network 600 has multiple convolutional layers, including convolutional layers 620, 640, 670*a*, and 670*b*. Although four convolutional layers are depicted in FIG. 6, the object property neural network 600 can have many more convolutional layers. As described in reference to FIG. 4, convolutional layers have one or more parameters that define one or more filters for each layer. A convolutional layer generates an output by performing a convolution of each neuron's filter with the layer's input. A convolution is a dot product of the parameters of a respective neuron's filter and the inputs to that neuron. The output is an activation map of that filter. In other words, the object property neural network 600 learns, i.e., is trained to have, filters that activate when it detects specific types of features at locations in the input to the network. Stacking the activation maps for all filters forms the full output of a convolutional layer. Every output can thus be interpreted as an output of a neuron that looks at a small region of the input and shares parameters with neurons in the same activation map.

Interspersed between the convolutional layers are max pooling layers, including max polling layers 630 and 650. Max pooling layers partition their inputs into a set of non-overlapping regions and, for each region, output the maximum. Max pooling layers serve to progressively reduce the spatial size of the batches of inputs to the object property neural network 600 to reduce the number of parameters and amount of computation in the network. This is possible because the exact location of a feature is less important than its rough location relative to other features.

The object property neural network 600 also has a depth concatenation layer 660 that takes as input one or more tensors and concatenates the tensors in the depth dimension. This operation can be described as "stacking" the input tensors to generate a new tensor. In particular, the depth concatenation layer 660 stacks the batches of inputs received by input layers 610*b* and 610*c*, and the processed batch of inputs received by input layer 610*a*.

Following the convolutional layers 670*a* and 670*b* are fully-connected layers 680*a* and 680*b*, respectively. Fully connected layers connect every neuron in the input layer to every neuron in the output layer. The fully-connected layers are trained to determine properties of objects based on the features detected by the preceding convolutional layers. In other words, if the preceding convolutional layers detect a particular subset of features at a particular location in the input data, the fully-connected layers can determine, based on their training and inputs, that an object at that particular location has certain properties. In particular, the fully-connected layer 680*a* is trained to determine bounding boxes for objects, and the fully-connected layer 680*b* is trained to determine classifications for objects.

The object property neural network 600 also has a soft-max layer 690 that receives from the fully-connected layer 680*b* the object classifications. The soft-max layer 690 receives vectors of real numbers from the fully-connected layer 680*b*, where each real number in a vector indicates a likelihood that an object is of a particular classification. The real numbers may be outside the range of zero to one. The soft-max layer 690 is trained to generate, for each object, a probability distribution of object classifications from zero to one. For example, the soft-max layer 690 might determine that a particular object is a pedestrian with 90% confidence and a street sign with 10% confidence. Those confidences can be provided to a planning subsystem of a vehicle for use by the vehicle in making autonomous driving decisions.

Figure 7:
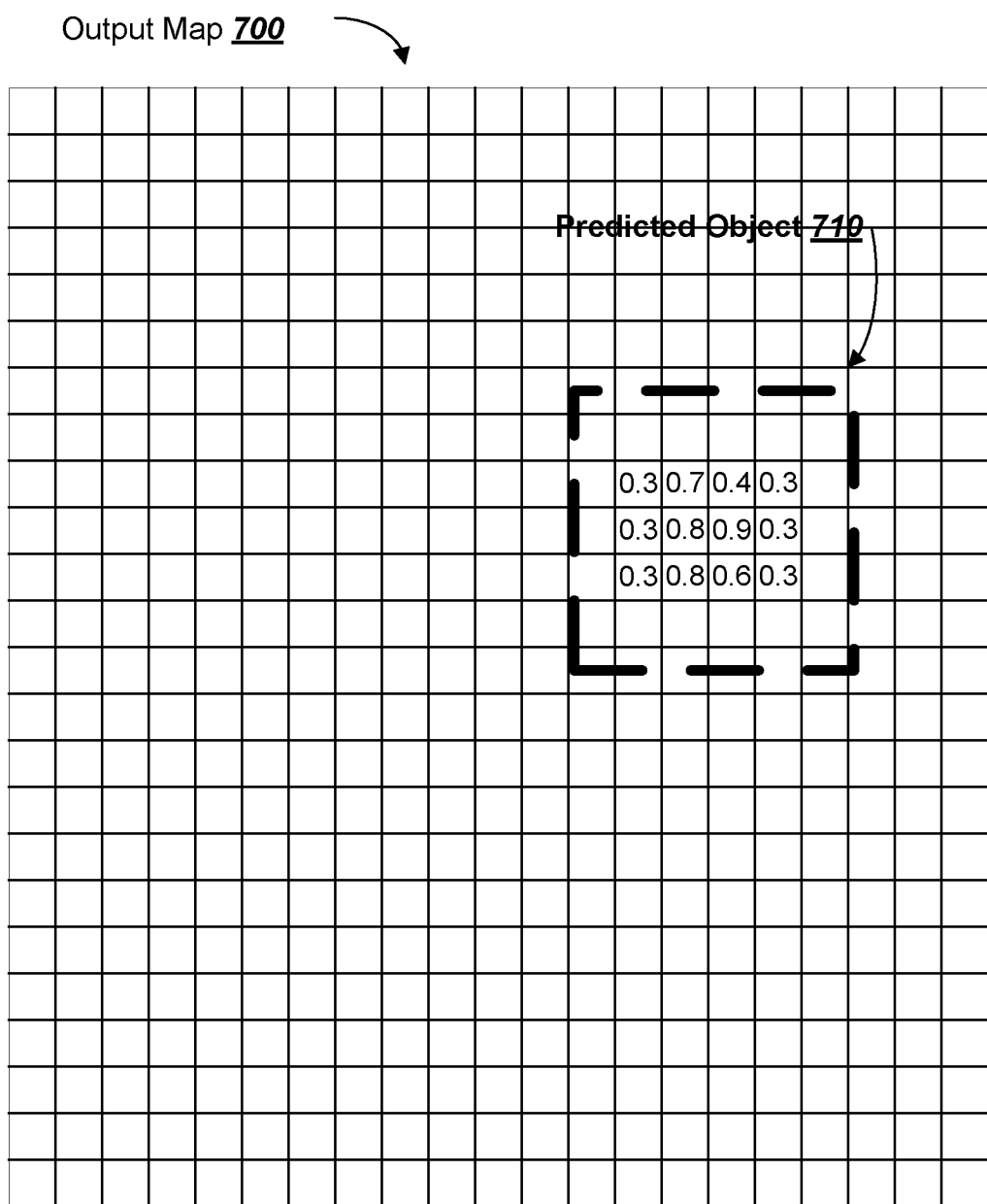
FIG. 7 depicts an example output map of object scores.

FIG. 7 depicts an example output map 700 generated by a center prediction neural network, e.g., the center prediction neural network 400 of FIG. 4. Each location in the output map 700 is represented by a small box. Each box corresponds to a point in the projected sensor data provided to the center prediction neural network and is associated with a numerical object score that represents a likelihood that a center of an object is located at a corresponding location in the environment. The object scores range from zero to one. An object score of zero indicates a low likelihood that an object center is located at a corresponding location in the environment. An object score of one indicates a high likelihood that an object center is located at a corresponding location in the environment. Although only a small subset of locations in output map 700 are associated with object scores, this is merely for convenience. In reality, every location in the output map 700 would be associated with an object score.

Predicted object 710 is located in output map 700. As described above, a high object score in a particular location indicates a high likelihood that a center of an object is located in that location. As such, the small box associated with object score of 0.9 likely corresponds to the center of predicted object 710.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
   receiving an input characterizing an environment external to a vehicle, wherein the input comprises, for each of a plurality of spatial locations in a multi-dimensional grid, sensor data captured by one or more sensors of the vehicle, wherein each spatial location in the multi-dimensional grid corresponds to a respective one of a plurality of locations in the environment;
   determining, for each of the plurality of locations in the environment, a respective first object score that represents a likelihood that a center of an object is located at the location by processing the input using a first neural network, wherein the first neural network is configured to receive the input and to process the input to generate a first network output that defines an output map comprising a respective first object score for each of the plurality of spatial locations in the multi-dimensional grid;
   selecting, using the first object scores, one or more locations from the plurality of locations as locations in the environment at which respective objects are likely centered; obtaining, for each of the selected locations, features characterizing the environment at the selected location; and
   determining, for each of the selected locations, object properties of the respective object that is likely centered at the selected location by processing a second network input comprising the features of the selected location using a second neural network, wherein the second neural network is configured to process the second network input to generate a second network output that defines the object properties of the object that is likely centered at the location.

2. The method of claim 1, further comprising:
   providing data identifying the object properties as input to a control system of the vehicle for use in controlling the vehicle.

3. The method of claim 1, wherein
   the first network output defines multiple output maps, each output map comprising first object scores that represent likelihoods that centers of objects of a particular classification are centered at the plurality of locations in the environment.

4. The method of claim 1, wherein the output map is generated in a single forward pass through the first neural network.

5. The method of claim 1, wherein the grid is two-dimensional, and wherein selecting the one or more locations using the first object scores comprises:
   selecting, from the spatial locations in a particular N-by-M region of the two-dimensional grid, a spatial location having a highest first object score; and
   refraining from selecting any of the other spatial locations in the particular N-by-M region of the two-dimensional grid.

6. The method of claim 1, wherein the second neural network is configured to perform the processing for two or more of the selected locations in parallel.

7. The method of claim 1, wherein the object properties include an object class to which the object belongs.

8. The method of claim 1, wherein the object properties include a two-dimensional or three-dimensional bounding box that identifies boundaries of the object.

9. The method of claim 1, wherein the object properties include a distance of the object from the vehicle.

10. The method of claim 1, wherein the object properties include a mask for the object, wherein the mask marks portions of the input defining the object.

11. The method of claim 1, wherein obtaining, for each of the selected locations, features characterizing the environment at the selected location comprises generating the features by processing the input using the first neural network.

12. The method of claim 1, wherein the features characterizing the environment at a selected location comprise an estimated scale of an object that is likely centered at the selected location.

13. The method of claim 1, wherein the second network input for a particular selected location further comprises other sensor data characterizing the particular selected location collected by one or more other sensors of the vehicle.

14. The method of claim 13, wherein the other sensor data characterizing the particular selected location is of a higher resolution than the sensor data in the input.

15. A system comprising one or more computers and one or more storage devices storing instructions that are operable, when executed by the one or more computers, to cause the one or more computers to perform operations comprising:
   receiving an input characterizing an environment external to a vehicle, wherein the input comprises, for each of a plurality of spatial locations in a multi-dimensional grid, sensor data captured by one or more sensors of the vehicle, wherein each spatial location in the multi-dimensional grid corresponds to a respective one of a plurality of locations in the environment;

determining, for each of the plurality of locations in the environment, a respective first object score that represents a likelihood that a center of an object is located at the location by processing the input using a first neural network, wherein the first neural network is configured to receive the input and to process the input to generate a first network output that defines an output map comprising a respective first object score for each of the plurality of spatial locations in the multi-dimensional grid;

selecting, using the first object scores, one or more locations from the plurality of locations as locations in the environment at which respective objects are likely centered;

obtaining, for each of the selected locations, features characterizing the environment at the selected location; and determining, for each of the selected locations, object properties of the respective object that is likely centered at the selected location by processing a second network input comprising the features of the selected location using a second neural network, wherein the second neural network is configured to process the second network input to generate a second network output that defines the object properties of the object that is likely centered at the location.

16. The system of claim 15, wherein the first network output defines multiple output maps, each output map comprising first object scores that represent likelihoods that centers of objects of a particular classification are centered at the plurality of locations in the environment.

17. The system of claim 15, wherein the output map is generated in a single forward pass through the first neural network.

18. The system of claim 15, wherein the grid is two-dimensional, and wherein selecting the one or more locations using the first object scores comprises:

selecting, from the spatial locations in a particular N-by-M region of the two-dimensional grid, a spatial location having a highest first object score; and refraining from selecting any of the other spatial locations in the particular N-by-M region of the two-dimensional grid.

19. The system of claim 15, wherein the second neural network is configured to perform the processing for two or more of the selected locations in parallel.

20. One or more non-transitory computer storage media encoded with computer program instructions that when executed by a plurality of computers cause the plurality of computers to perform operations comprising:

receiving an input characterizing an environment external to a vehicle, wherein the input comprises, for each of a plurality of spatial locations in a multi-dimensional grid, sensor data captured by one or more sensors of the vehicle, wherein each spatial location in the multi-dimensional grid corresponds to a respective one of a plurality of locations in the environment;

determining, for each of the plurality of locations in the environment, a respective first object score that represents a likelihood that a center of an object is located at the location by processing the input using a first neural network, wherein the first neural network is configured to receive the input and to process the input to generate a first network output that defines an output map comprising a respective first object score for each of the plurality of spatial locations in the multi-dimensional grid;

selecting, using the first object scores, one or more locations from the plurality of locations as locations in the environment at which respective objects are likely centered;

obtaining, for each of the selected locations, features characterizing the environment at the selected location; and determining, for each of the selected locations, object properties of the respective object that is likely centered at the selected location by processing a second network input comprising the features of the selected location using a second neural network, wherein the second neural network is configured to process the second network input to generate a second network output that defines the object properties of the object that is likely centered at the location.

* * * * *